United States Patent
Evans et al.

(10) Patent No.: US 9,725,181 B2
(45) Date of Patent: Aug. 8, 2017

(54) OFF WING EVACUATION SYSTEM CONTROL STRAP

(71) Applicant: GOODRICH CORPORATION, Charlotte, NC (US)

(72) Inventors: Steven Evans, Sun City, AZ (US); Nick Ruegsegger, Peoria, AZ (US); Ryan Schmidt, Gilbert, AZ (US); Craig Erwin Prevost, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 41 days.

(21) Appl. No.: 14/802,234

(22) Filed: Jul. 17, 2015

(65) Prior Publication Data

US 2017/0015429 A1    Jan. 19, 2017

(51) Int. Cl.
  *B64D 25/14*    (2006.01)
(52) U.S. Cl.
  CPC .................................. *B64D 25/14* (2013.01)
(58) Field of Classification Search
  CPC .................................. B64D 25/14; A62B 1/20
  See application file for complete search history.

(56) References Cited

U.S. PATENT DOCUMENTS

| | | | |
|---|---|---|---|
| 3,679,025 A | 7/1972 | Rummel | |
| 3,973,645 A | 8/1976 | Dix et al. | |
| 4,018,321 A | 4/1977 | Fisher | |
| 4,333,546 A | 6/1982 | Fisher | |
| 4,460,062 A * | 7/1984 | Fisher | B64D 25/14 182/48 |
| 4,846,422 A | 7/1989 | Fisher | |
| 6,443,259 B1 * | 9/2002 | Oney | B64D 25/14 182/18 |
| 6,799,741 B2 | 10/2004 | Danielson et al. | |
| 6,814,183 B2 * | 11/2004 | Horvath | B64D 25/14 182/48 |
| 6,877,696 B2 * | 4/2005 | Moro | B64D 25/14 182/48 |
| 6,959,658 B2 * | 11/2005 | Gronlund | B64D 25/14 112/475.01 |
| 2003/0226713 A1 * | 12/2003 | Baker | A62B 1/20 182/48 |

FOREIGN PATENT DOCUMENTS

| | | |
|---|---|---|
| EP | 0034357 | 8/1981 |
| GB | 1316815 | 5/1973 |
| GB | 1403504 | 8/1975 |

OTHER PUBLICATIONS

Extended European Search Report dated Dec. 8, 2016 in European Application No. 16179911.9.

* cited by examiner

*Primary Examiner* — Joseph W Sanderson
(74) *Attorney, Agent, or Firm* — Snell & Wilmer L.L.P.

(57) ABSTRACT

A movement control strap for an off-wing evacuation system is disclosed. The strap is coupled between the ramp and slide, and engages with the edge of the wing. The strap stabilizes the evacuation system by providing a tensioning force to control movement of the ramp and slide. The strap assembly utilizes the edge of the wing as a leverage point for extra tensioning and control of the system.

19 Claims, 4 Drawing Sheets

OFF WING EVACUATION SYSTEM CONTROL STRAP

BACKGROUND

An off-wing evacuation system is designed to have a ramp that leads to the sliding portion of the system. Typically, as an evacuee jumps onto the slide, the downward force on the slide exerts a torque on the ramp, causing a portion of the ramp to rotate away from the wing surface; as an evacuee exits the slide, the ramp may fall back to the wing surface. This motion of the ramp causes a tripping hazard for subsequent evacuees entering the ramp. High wind conditions may also destabilize the evacuation system, for example by lifting the slide away from the wing surface.

SUMMARY

According to various embodiments, disclosed is a movement controlled off-wing evacuation system and movement control strap for an aircraft including a wing, comprising a ramp, a slide extending from the ramp, and a movement control strap coupled between the ramp and the slide, the movement control strap comprising a first portion attached to the ramp at a ramp anchoring point, a second portion attached to the slide at a slide anchoring point, and a third portion between the first portion and the second portion, wherein the third portion is configured to engage with the wing of the aircraft at a wing anchoring point.

According to various embodiments, the ramp anchoring point is at an underside of the ramp; and the slide anchoring point is at an underside of the slide.

According to various embodiments, the first portion and the second portion are opposite ends of the movement control strap.

According to various embodiments, the ramp comprises a walking portion having a ramp leading edge forming a ramp entrance, wherein the ramp anchoring point is proximate the ramp leading edge.

According to various embodiments, the ramp anchoring point is centered about the ramp leading edge.

According to various embodiments, the ramp leading edge is configured to substantially rest upon the wing, the ramp further comprising a ramp trailing edge opposite the ramp leading edge, wherein the ramp trailing edge is configured to be suspended above the wing edge.

According to various embodiments, the slide comprises a lower slide edge and an upper slide edge, forming a sliding portion there between, wherein the slide anchoring point is below the upper slide edge.

According to various embodiments, the sliding portion is centered between a first slide rail and a second slide rail, wherein the slide anchoring point is at one of the first slide rail or the second slide rail.

According to various embodiments, the wing comprises a wing trailing edge, wherein the wing engagement point is at the wing trailing edge.

According to various embodiments, the ramp and the slide are components of a continuous inflatable unit.

According to various embodiments, disclosed is an off wing evacuation method for an aircraft, the aircraft including an aircraft wing, comprising: coupling a first portion of a movement control strap to an underside of an evacuation ramp; coupling a second portion of the movement control strap to an underside of an evacuation slide, wherein the evacuation ramp and the evacuation slide form a continuous inflatable unit; and engaging a third portion of the movement control strap at an edge of the aircraft wing, wherein the third portion of the movement control strap is located between the first portion and the second portion of the movement control strap.

According to various embodiments, evacuation ramp has a ramp leading edge forming a ramp entrance, wherein the movement control strap is coupled approximately at said ramp leading edge. According to various embodiments, the aircraft wing includes a wing trailing edge, and the off wing evacuation method further comprises engaging the third portion of the movement control strap at the wing trailing edge. According to various embodiments, the evacuation ramp includes a ramp leading edge forming a ramp entrance, further comprising: positioning the evacuation ramp upon the aircraft wing, wherein the ramp leading edge is positioned to substantially rest upon the aircraft wing; and anchoring the ramp leading edge to the aircraft wing via the movement control strap.

According to various embodiments, the evacuation ramp further comprises a ramp trailing edge opposite the ramp leading edge, the aircraft wing including a wing edge, further comprising positioning the ramp trailing edge to be suspended above the wing edge; and positioning the movement control strap to engage with the wing edge.

According to various embodiments, the slide comprises a lower slide edge and an upper slide edge, forming a sliding portion there between, the method further comprising coupling the second portion of the movement control strap below the upper slide edge.

According to various embodiments, the sliding portion is centered between a first slide rail of the slide and a second slide rail of the slide, the method further comprising coupling the second portion of the movement control strap to one of the first slide rail or the second slide rail.

According to various embodiments, the method further comprises positioning the movement control strap to engage with the wing trailing edge.

According to various embodiments, strap comprises loop patches for attachment.

According to various embodiments, the ramp comprises rails.

BRIEF DESCRIPTION OF THE DRAWINGS

The drawings described herein are for illustration purposes only and are not intended to limit the scope of the present disclosure in any way. The present disclosure will become more fully understood from the detailed description and the accompanying drawings wherein.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
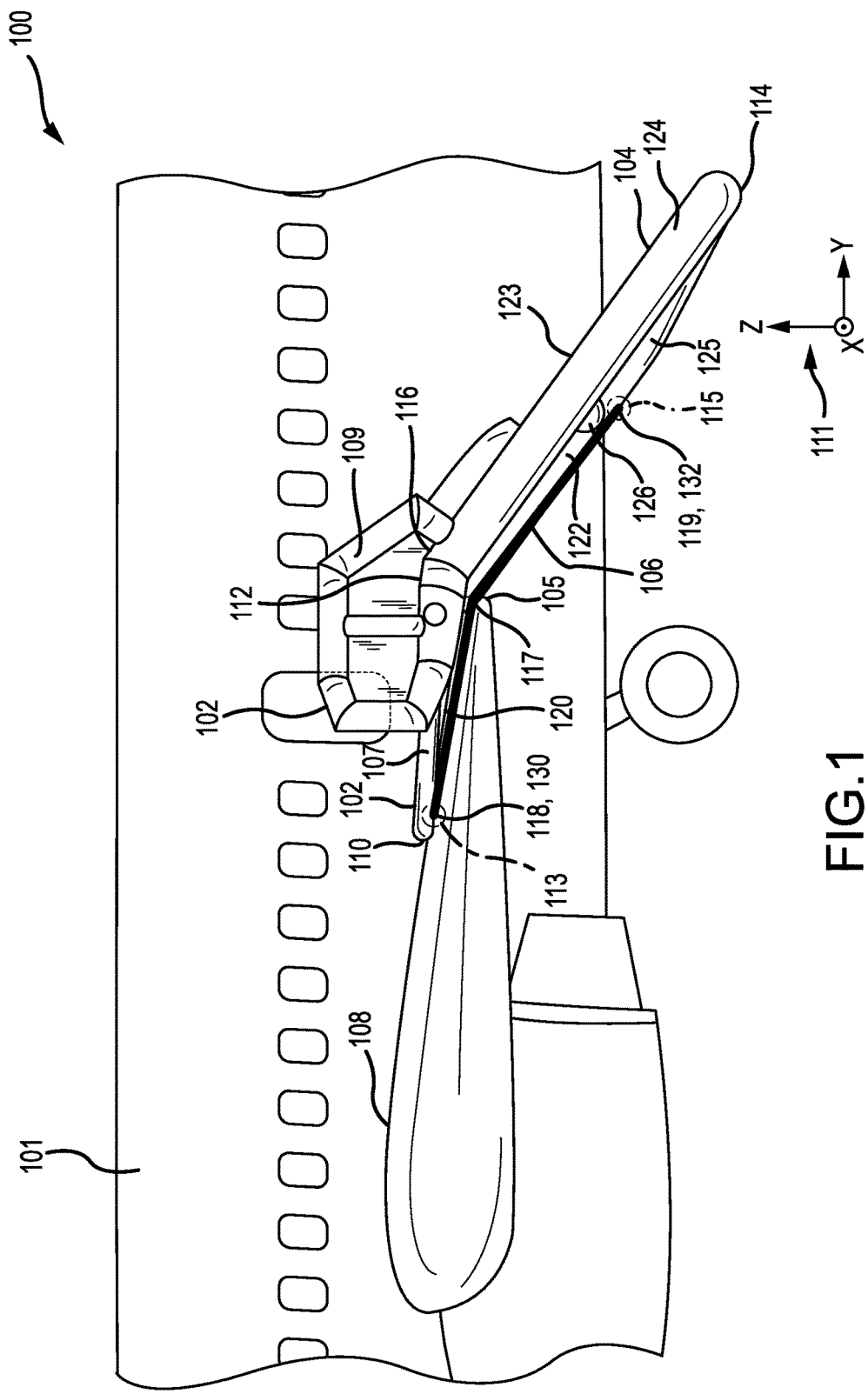
FIG. 1 is an illustration of an off-wing evacuation system with a movement control strap for an aircraft, according to various embodiments.
Figure 2A:
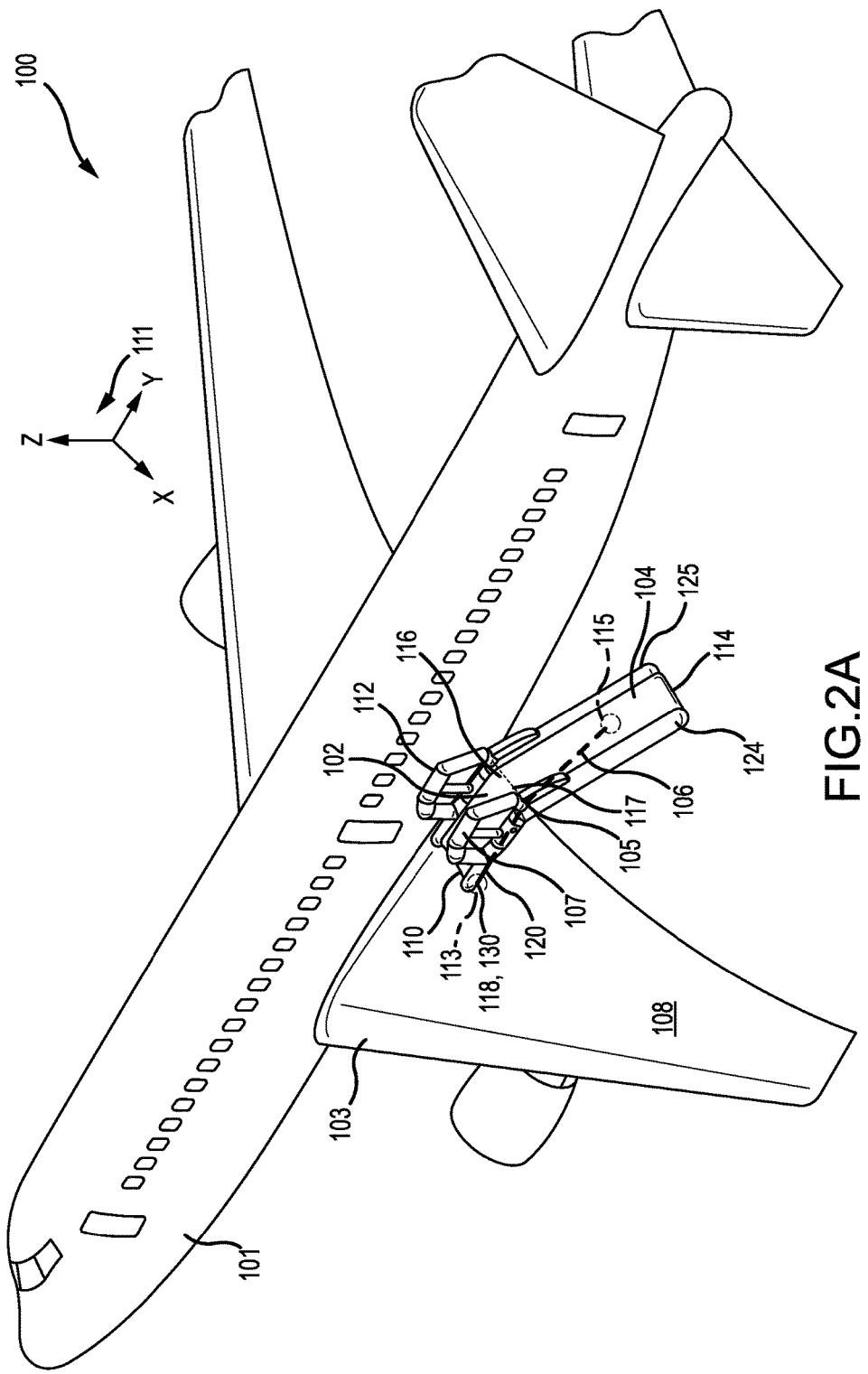
FIG. 2A is a perspective view of the system of FIG. 1, according to various embodiments.

In accordance with various embodiments, shown in FIGS. 1 and 2A show a movement controlled off-wing evacuation system 100 for an aircraft 101 comprising a ramp 102, a slide 104 extending downwards (along the "z" axis of reference axis 111) and back (in the "y" or aft direction) from the ramp 102 when inflated, and a movement control strap 106 coupled between the ramp 102 and slide 104, and in engagement with the wing 108 of aircraft 101. Both ramp 102 and slide 104 form a continuous inflatable unit, according to various embodiments, and are shown in an inflated state in the figures.

According to various embodiments, ramp 102 comprises a ramp leading edge 110 forming the ramp entrance, a walking portion 107, and may include rails 109. According to various embodiments, walking portion 107 and ramp leading edge 110 are generally horizontal but may also be slightly angled to conform to the geometry of the wing 108. According to various embodiments, slide 104 comprises a sliding portion 123 centered between a first slide rail 124 and a second slide rail 125. Slide 104 may include structural support components such as transverse tube 126, for example.

Wing 108 generally slopes downwards from its wing leading edge 103 to its wing trailing edge 105 (along the "y" axis of reference axis 111). During off-wing evacuation, the ramp leading edge 110 of ramp 102 rests on wing 108, and the ramp trailing edge 112 of ramp 102, or of walking portion 107, is suspended approximately above wing trailing edge 105 of wing 108. Evacuees exit the aircraft 101 onto wing 108, enter and walk through the ramp 102, and then slide down the slide 104, according to various embodiments.

According to various embodiments, movement control strap 106 comprises a first portion 118, which is located at a first end 130 of movement control strap 106, attached to the underside 120 of ramp 102 at an anchoring point 113 ("ramp anchoring point 113"); and a second portion 119, which is located at a second end 132 of movement control strap 106, attached to the underside 122 of slide 104 at an anchoring point 115 ("slide anchoring point 115"). According to various embodiments, ramp anchoring point 113 is proximate ramp leading edge 110. According to various embodiments, slide anchoring point 115 is between the lower edge 114 (or ground edge 114) of slide 104 and the upper edge 116 of slide 104. According to various embodiments, slide anchoring point 115 is approximately around lower edge 114 of slide 104. According to various embodiments, ramp anchoring point 113 may be anywhere along ramp leading edge 110. According to various embodiments, ramp anchoring point 113 may be approximately centered along the ramp's width (along the "x" axis of reference axis 111). According to various embodiments, ramp anchoring point 113 may be off center. According to various embodiments, slide anchoring point 115 may be approximately centered (i.e. attached at transverse tube 126); or off centered with an attachment point at one of the slide's side rails 124, 125, for example. According to various embodiments, both ramp anchoring point 113 and slide anchoring point 115 are off-center. According to various embodiments, one of the anchoring points 113, 115, may be off centered in one direction (i.e. away from the body of the aircraft 101), and the other anchoring point may be off centered in the other direction (i.e. towards the body of the aircraft 101). This configuration may help anchor the leading edge of the ramp more closely with the wing 108.

Movement control strap 106 further engages wing 108 at a point 117 ("wing engagement point 117") on wing trailing edge 105 of the wing 108, and may configured to be in contact with wing trailing edge 105. Typically, as one evacuee jumps onto the slide 104, the force exerted in the negative z direction on the slide 104 tends to exert a torque on the ramp 102 to urge the ramp 102 to rotate away from the wing 108 in the positive z direction and positive y direction simultaneously. However, the movement control strap 106 retains ramp 102 against wing 108 and thus tends to prevent ramp 102 from rotating with respect to wing 108. As an evacuee exits the slide 104, movement control strap 106 tends to retain slide 104 with respect to wing 108, thus reducing relative motion between slide 104 and wing 108. The engagement of movement control strap 106 against the wing 108, provides reinforcing tension and leverage for controlling undesired movement of the ramp 102 and slide 104, and anchoring of the ramp 102 to the wing 108. Thus, movement control strap 106 tensions the ramp 102 towards the wing 108.

According to various embodiments, movement control strap 106 may comprise a webbing, such as a nylon webbing, rope, cord, or strap. According to various embodiments, movement control strap 106 may comprise a para-aramid fiber such as that sold under the mark KEVLAR. According to various embodiments, movement control strap 106 may comprise a nylon fiber or nylon fiber blend such as those sold under the mark CORDURA. Movement control strap 106 may have a high tensile strength. According to various embodiments, movement control strap 106 comprises a tubular nylon webbing conforming to a U.S. military specification MIL-W-5625K Natural. Such webbing comprises a 420d Fill, 840d ground yarn nylon, and is about 9/16 inches (22.86 cm) wide, with tensile strength of 1500 lbs (680 Kg), and weight of 0.60 oz./linear yard (about 31 g/m). Such material webbing may have a flammability requirement to meet governmental standards, for example, in the United States, 14 CFR 25.853. Movement control strap 106 may have one or more loop patches on both first and second ends that are bonded to the ramp 102 and slide 104.

Figure 2B:
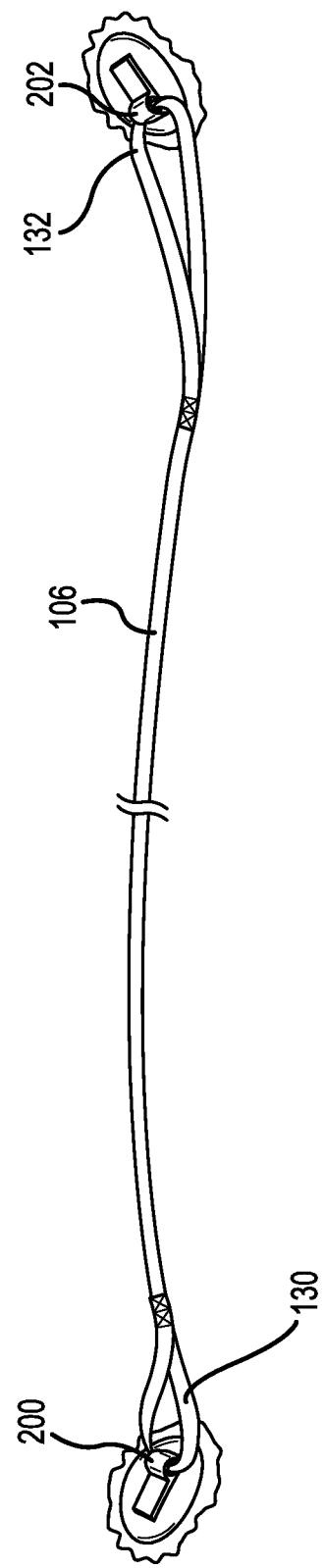
FIG. 2B is an illustration of a movement control strap for the system of FIG. 1, according to various embodiments.

According to various embodiments, movement control strap 106 is attached at either of its ends. According to various embodiments, movement control strap 106 may be attached via an attachment element such as a loop patch which may form one or both of its ends for bonding to the ramp 102 and slide 104 of the system (e.g. via adhesive). For example, FIG. 2B shows the movement control strap 106 comprising a first loop patch 200 which is looped around first end 130 of movement control strap 106 for bonding to the ramp 102, and a second loop patch 202 which is looped around second end 132 for bonding to the slide 104. According to various embodiments, off-wing evacuation system 100 may include a plurality of movement control straps 106. According to various embodiments, off-wing evacuation system 100 comprises a slide 104 and ramp 102 including an attached movement control strap 106, which is stowed as one unit.

Specific materials, arrangements, attachment sites for the movement control strap 106, etc. may depend on the specific slide and ramp system used, including factors such as size and weight of evacuation system and/or aircraft, required operating capacity, weather conditions, etc.

Figure 3:
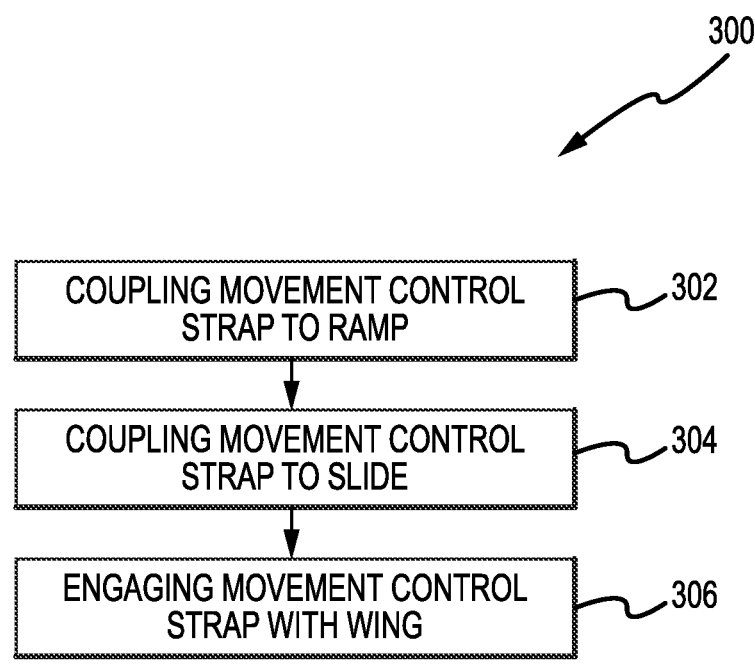
FIG. 3 illustrates an aircraft off-wing evacuation method, according to various embodiments.

FIG. 3 illustrates an off wing evacuation method 300, according to various embodiments, comprising coupling a first portion of a movement control strap 302 to the underside of an evacuation ramp. The method further comprises coupling a second portion of a movement control strap 304 to the underside of an evacuation slide 304. The method further comprises engaging a third portion of the movement control strap 306 at an edge of a wing. According to various embodiments, the ramp 102 and slide 104 form a continuous inflatable unit. According to various embodiments, the third portion of the movement control strap is located between the first portion and second portion of the movement control strap.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A movement controlled off-wing evacuation system comprising:
   an aircraft having a wing;
   a ramp;
   a slide extending from said ramp; and
   a movement control strap coupled between said ramp and said slide,
   said movement control strap comprising a first portion attached to said ramp at a ramp anchoring point, a second portion attached to said slide at a slide anchoring point, and a third portion between said first portion and said second portion,
   wherein said third portion is configured to anchor with the wing of the aircraft at a wing anchoring point.

2. The movement controlled off-wing evacuation system of claim 1, wherein
   said ramp anchoring point is at an underside of said ramp; and
   said slide anchoring point is at an underside of said slide.

3. The movement controlled off-wing evacuation system of claim 1, said first portion comprising a loop patch for attachment to said ramp, and said second portion comprising a loop patch for attachment to said slide, said first portion and said second portion being opposite ends of said movement control strap.

4. The movement controlled off-wing evacuation system of claim 1, said ramp comprising a walking portion having a ramp leading edge forming a ramp entrance, wherein said ramp anchoring point is at said ramp leading edge.

5. The movement controlled off-wing evacuation system of claim 4, said ramp anchoring point is centered about said ramp leading edge.

6. The movement controlled off-wing evacuation system of claim 4, said ramp leading edge configured to substantially rest upon the wing including a wing edge, said ramp further comprising a ramp trailing edge opposite said ramp leading edge, wherein said ramp trailing edge is configured to be suspended above said wing edge.

7. The movement controlled off-wing evacuation system of claim 1, said slide comprising a lower slide edge and an upper slide edge, forming a sliding portion there between, wherein said slide anchoring point is below said upper slide edge.

8. The movement controlled off-wing evacuation system of claim 1, said wing comprising a wing trailing edge, wherein said wing engagement point is at said wing trailing edge.

9. The movement controlled off-wing evacuation system of claim 1, wherein the ramp and the slide are components of a continuous inflatable unit.

10. An off wing evacuation method for an aircraft, the aircraft including an aircraft wing, comprising:
    coupling a first portion of a movement control strap to an underside of an evacuation ramp;
    coupling a second portion of said movement control strap to an underside of an evacuation slide, wherein said evacuation ramp and said evacuation slide form a continuous inflatable unit; and anchoring a third portion of said movement control strap to an edge of the aircraft wing,
wherein said third portion of the movement control strap is located between said first portion and said second portion of the movement control strap.

11. The off wing evacuation method of claim 10, said evacuation ramp having a ramp leading edge forming a ramp entrance, wherein said movement control strap is coupled to said ramp leading edge.

12. The off wing evacuation method of claim 11, the aircraft wing including a wing trailing edge, the off wing evacuation method further comprising engaging said third portion of said movement control strap at said wing trailing edge.

13. The off wing evacuation method of claim 10, said evacuation ramp having a ramp leading edge forming a ramp entrance, further comprising:
positioning said evacuation ramp upon the aircraft wing, wherein said ramp leading edge is positioned to substantially rest upon the aircraft wing; and
anchoring said ramp leading edge to the aircraft wing via said movement control strap.

14. The off wing evacuation method of claim 13, said evacuation ramp further comprising a ramp trailing edge opposite said ramp leading edge, the aircraft wing including a wing edge,
further comprising positioning said ramp trailing edge to be suspended above said wing edge; and
positioning said movement control strap to engage with said wing edge.

15. The off wing evacuation method of claim 10, said slide comprising a lower slide edge and an upper slide edge, forming a sliding portion therebetween, further comprising coupling said second portion of said movement control strap below said upper slide edge.

16. The off wing evacuation method of claim 10, said sliding portion further being centered between a first slide rail of said slide and a second slide rail of said slide, further comprising coupling said second portion of said movement control strap to at least one of said first slide rail or said second slide rail.

17. The off wing evacuation method of claim 10, the aircraft wing comprising a wing trailing edge, further comprising positioning said movement control strap to engage with said wing trailing edge.

18. The off wing evacuation method of claim 10, said movement control strap comprising a-loop patches for said coupling.

19. The off wing evacuation method of claim 10, said ramp comprising rails.

* * * * *